Sept. 5, 1967  J. HARGREAVES ET AL  3,339,257

CUTTING TOOLS

Filed Feb. 26, 1965

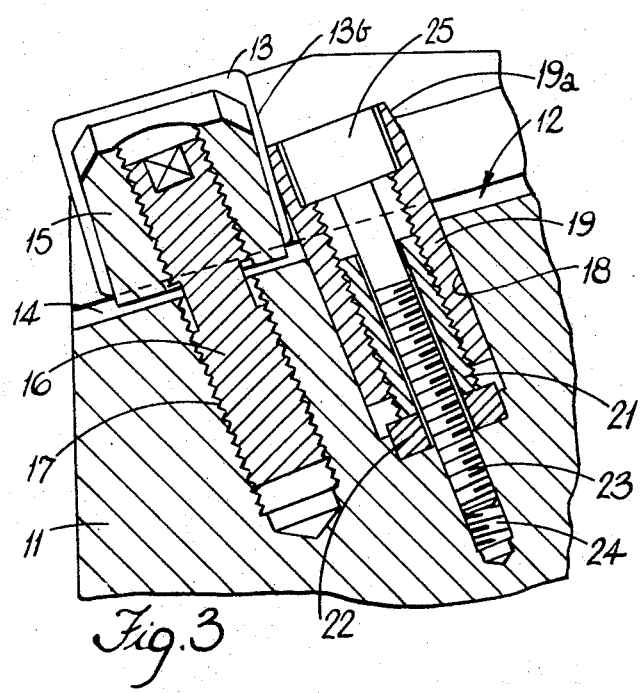
Fig.3
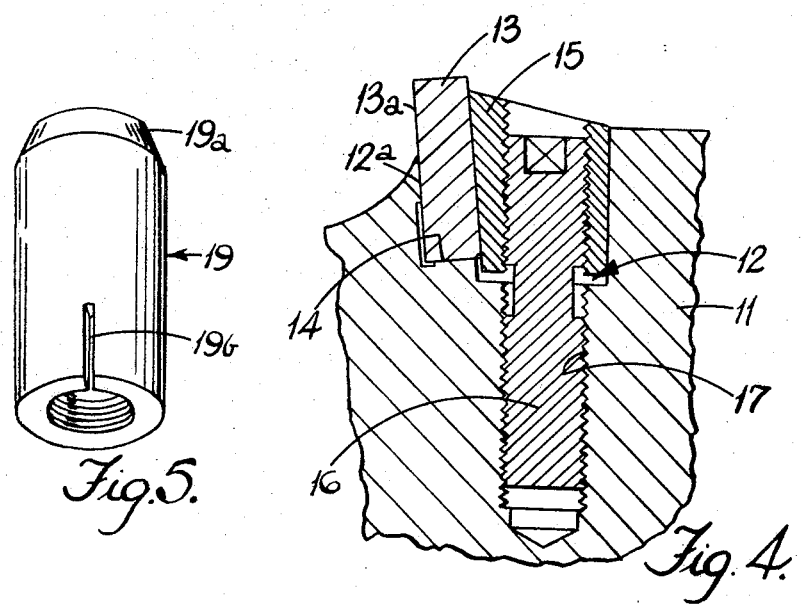
Fig.5.
Fig.4.

United States Patent Office 3,339,257
Patented Sept. 5, 1967

3,339,257
CUTTING TOOLS
James Hargreaves, Coventry, and Graham John Powell, Nuneaton, England, assignors to Wickman Wimet Limited, Coventry, England
Filed Feb. 26, 1965, Ser. No. 435,417
Claims priority, application Great Britain, Mar. 2, 1964, 8,665/64
1 Claim. (Cl. 29—105)

This invention relates to cutting tools of the kind comprising a body having therein a slot, and an indexable cutting insert held in the slot with one face of the insert resting on part of the base of the slot.

According to the invention, a tool of the kind specified includes an adjustment member for adjusting the position of the insert along the base of the slot, the adjustment member being axially movable in a bore which extends into the body at an acute angle to said part of the base of the slot on which said one face of the insert rests, and acting on the insert so that axial movements of the adjustment member serve to adjust the position of the insert along the base of the slot.

Figure 1:
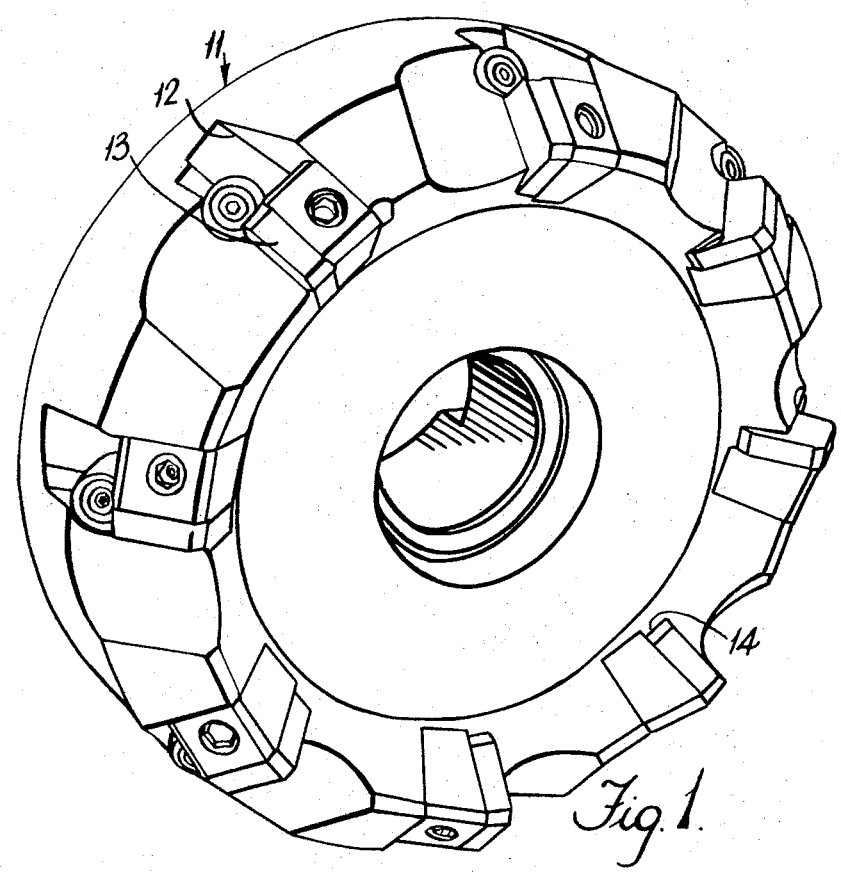
Figure 2:
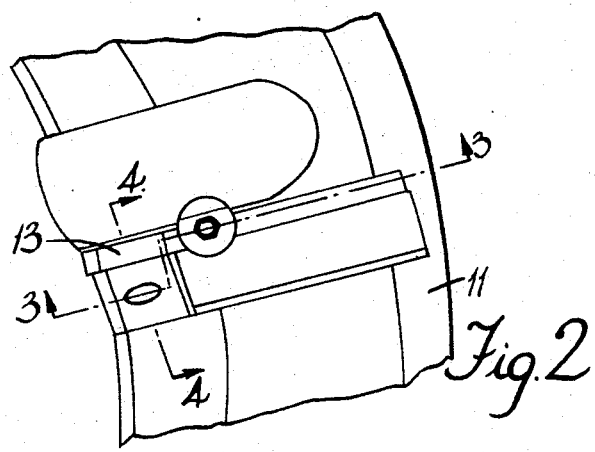
Figure 6:
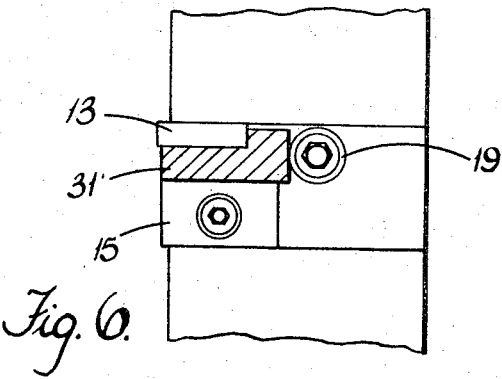
Figure 7:
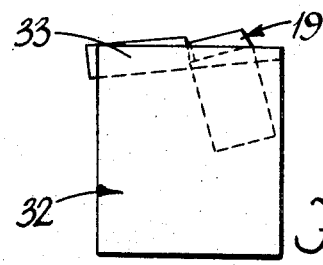
Figure 8:
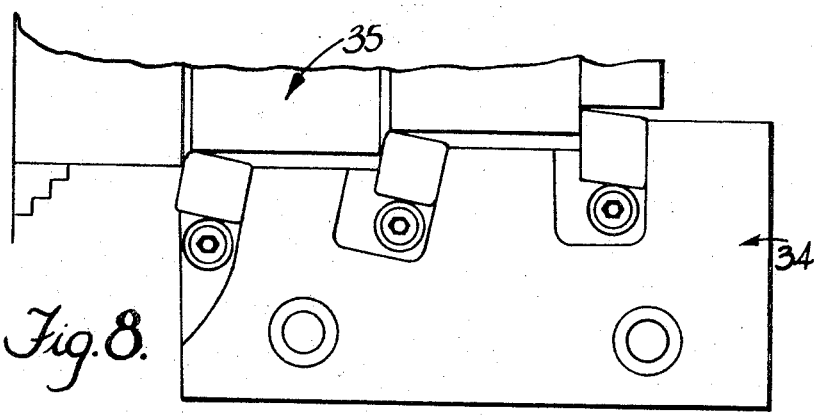

In the accompanying drawings, FIGURE 1 is a perspective view of a milling cutter in accordance with one example of the invention, FIGURE 2 is a plan view of one of the inserts and its associated parts, FIGURES 3 and 4 respectively are sections on the lines 3—3 and 4—4 in FIGURE 2, FIGURE 5 is a perspective view showing the sleeve seen in FIGURE 3, FIGURE 6 is a fragmentary view illustrating a modification, and FIGURES 7 and 8 are sketches illustrating parts of two further examples.

Referring to FIGURE 1, the milling cutter comprises a short cylindrical body 11 having in its periphery a plurality of slots 12 each accommodating an indexable cutting insert 13. The slots and their associated components are similar, and so only one will be described.

Referring to FIGURE 4, each slot includes a base which is stepped to provide a ledge 14 of width slightly less than the thickness of an insert 13. In use, the insert 13 is placed in position with one edge thereof resting on the ledge and one side 13a of the insert in contact with one side 12a of the slot 12. The side 12a may be relieved as shown to reduce its area. The insert is clamped in position by a wedge 15 in the slot in wedging engagement with the other side of the insert, the wedge being held in position by a screw 16 having a waisted central portion, a lower portion formed with a right-hand screw-thread engaging a bore 17 in the base of the slot, and an upper portion formed with a left-hand thread and in screw-threaded engagement with the wedge 15. The opposite hand threads enable the wedge to be tightened and released quickly since one turn of the screw 16 moves the wedge through a distance equal to the sum of the pitches of the two threads.

The slot 12 is positioned to present the insert at the required cutting rake and is inclined towards the axis of the cutter at the required bevel angle of the insert, the angle in the example shown being 75°. The insert is adjustable in the slot 12 along the ledge 14, and for this purpose, extending into the cutter body 11 at the rear of the insert is a bore 18 (FIGURE 3) which is at a large acute angle, for example eighty to eighty-eight degrees, to the ledge 14 so as to be at a small acute angle to the edge 13b of the insert. In this bore 18 is a sleeve 19 which at its upper end engages the edge 13b of the insert and is conveniently chamfered as shown at 19a so as to extend along the edge 13b. The sleeve 19 is formed at its lower end with an axially extending slit 19b so that the sleeve can be forced into the bore. The arrangement is such that the sleeve can move axially, but not angularly, in the bore 18. The sleeve 19 is internally screw-threaded, and the lower portion thereof is engaged by an externally screw-threaded hollow adjustment pin 21 the head of which is adapted to receive a key and the other end of which bears against a washer 22 in the base of the bore 18. The arrangement is such that when the pin 21 is moved angularly, the sleeve 19 will move axially and so impart the desired movement to the insert by virtue of the angle between the axis of the bore and the edge 13b of the insert. It will be understood that the wedge 15 is slackened before the insert is adjusted, and the key is graduated to facilitate precise adjustment of the insert.

When the insert has been adjusted, the sleeve and adjustment pin are locked in position by a locking pin 23 extending through the adjustment pin 21 into a threaded bore 24 at the bottom of the bore 18. At its upper end, the pin 23 is formed with a head 25 which is accommodated in a recess in the sleeve.

The arrangement described enables very fine precise adjustments of the insert to be made, since the distance the insert moves per turn of the adjustment screw is dependent on the angle between the axis of the bore 18 and the edge 13b of the insert. This angle is preferably less than 10° as shown, and it will be appreciated that depending on the shape of the insert the angle between the bore 18 and the part of the slot 12 against which an edge of the insert rests need not be near to 90°. For example, for triangular inserts the angle would be 50° to give a 10° inclination between the insert and sleeve 19.

Referring now to FIGURE 6, this modification shows the insert 13 in a recess in a separate part 31. The operation is similar except that both the wedge 15 and the sleeve 19 act on the insert 13 through the intermediary of the part 31.

The invention is not limited to milling cutters, and FIGURE 7 is a diagrammatic view showing facing tool having a body 32 having a slot supporting an indexable cutting insert 33 with a side of the insert (as distinct from an edge of the insert as in FIGURES 1 to 6) resting on the base of the slot. It will be noted that in the claim the term "face" is used generically to include a side or an edge of the insert. The insert 33 is acted upon by an adjustment member the form of which is identical to the adjustment member shown in FIGURES 1 to 5. The insert 33 is held in position in the slot by a clamp (not shown) which can take a variety of known forms, one suitable form being shown for example in our British Patent No. 976,597.

FIGURE 8 shows a combined tool holder with a body 34 with three slots each supporting an insert, the three inserts acting simultaneously on a rotating workpiece 35. The mounting and adjustment of such inserts is similar to FIGURE 7.

Having thus described our invention what we claim as new and desire to secure by Letters Patent is:

A milling cutter including a body adapted to support a plurality of indexable cutting inserts, each insert when in place having one edge thereof resting on part of the base of a slot in the body and one side thereof held against one side of the slot by a wedge in the slot, and a plurality of adjustment members for adjusting the positions of the inserts along the bases of the slots, each adjustment member in use acting on its insert and being axially movable in a bore which extends into the body at an acute angle to said part of the base of the slot on which said one edge of the insert rests, so that axial movements of the adjustment member serve to adjust the position of the appropriate insert along the base of its slot, each adjustment member comprising a sleeve located in said bore so that said sleeve can move axially but not angularly in said bore, and an externally screw-threaded adjustment pin in screw-threaded engagement with the sleeve and engaging the bottom of the bore, turning of said pin serving to adjust the axial position of the sleeve, which extends from said bore and acts on the appropriate insert, and said milling cutter further including a plurality of removable locking pins extending through the adjustment pins respectively and engaged with screw-threaded bores extending into said body from the lower ends of said bores in which said sleeves are located, the locking pins having heads accommodated in recesses in said sleeves when the locking pins are in position.

References Cited

UNITED STATES PATENTS

| | | | |
|---|---|---|---|
| 3,188,718 | 6/1965 | Wezel | 29—105 |
| 3,205,559 | 9/1965 | Greenleaf | 29—105 |
| 3,242,553 | 3/1966 | Bogsten | 29—105 |

FOREIGN PATENTS

| | | |
|---|---|---|
| 933,613 | 8/1963 | Great Britain. |
| 596,664 | 8/1959 | Italy. |

HARRISON L. HINSON, *Primary Examiner.*